United States Patent [19]

Dubuisson

[11] 3,781,104

[45] Dec. 25, 1973

[54] STEREOSCOPIC PLOTTING APPARATUS
[75] Inventor: Bernard Louis Yves Dubuisson, Paris, France
[73] Assignee: Societe Francaise D'Optique Et De Mecanique S. F. O. M., Rueil-Malmaison, France; part interest to each
[22] Filed: May 21, 1969
[21] Appl. No.: 826,618

[30] Foreign Application Priority Data
May 22, 1968  France .......................... 68152653

[52] U.S. Cl. ................................................. 355/22
[51] Int. Cl. ..................... G03b 37/32, G03b 35/14
[58] Field of Search ..................... 353/4, 5, 6, 7; 33/20 D; 385/22; 355/22

[56] References Cited
UNITED STATES PATENTS
3,244,893  4/1966  Miller ................................... 353/6

FOREIGN PATENTS OR APPLICATIONS
729,857  3/1966  Canada ................................. 33/20
612,996  1/1961  Canada ................................. 33/20
1,290,535  3/1962  France ................................. 353/6

Primary Examiner—John M. Horan
Attorney—Waters, Roditi and Schwartz & Nissen

[57] ABSTRACT

The apparatus comprises a table displaceable vertically by a manual control, and two projectors each projecting a photograph. The vertical displacement of the table causes, by a synchrotransmitter, a synchroreceiver and a threaded shaft, a proportional horizontal displacement of one of the projectors towards or away from the other projector. This apparatus brings out the relief, even if it is not very pronounced.

4 Claims, 1 Drawing Figure

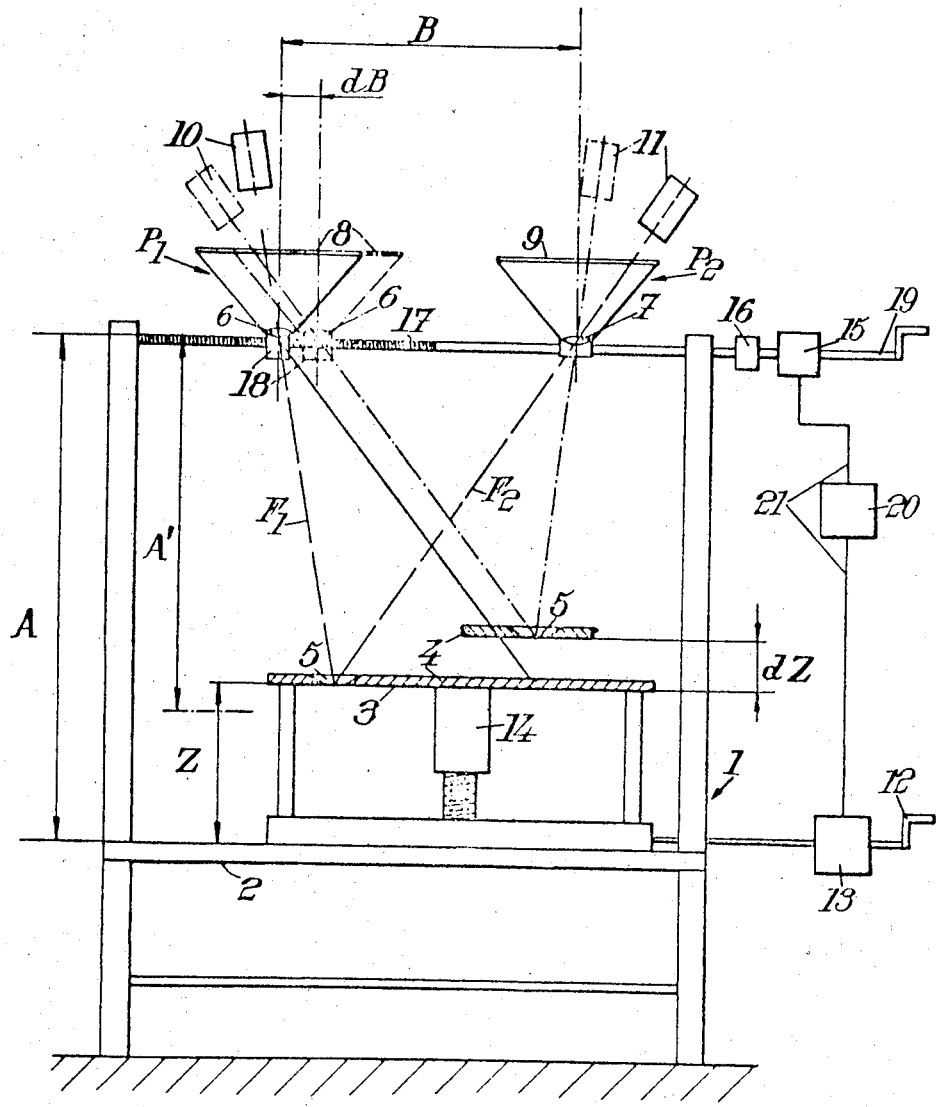

3,781,104

STEREOSCOPIC PLOTTING APPARATUS

This invention relates to stereoscopic plotting apparatus.

Such apparatus, which is frequently used for the stereoscopic plotting of aerial photographs with a view to establishing maps, generally comprises, on the one hand, two projectors adapted respectively to project, on a table disposed at an adjustable distance frome these projectors, two photographs of the same subject taken at two distinct points and forming a stereoscopic pair such that these photographs and the beams projecting on the table the images of each zone of the subject occupy positions substantially homologous to the positions that were occupied, during the taking of the photographs, by the photographic films and the beams corresponding to the zone considered, and on the other hand, a system of exposition permitting the photographic recording, on two sensitive surfaces successively disposed on the table, of the image resulting from the projection of one of the photographs, then of the image resulting from the projection of the other photograph.

As is known in this technique, the two photographs of a pair are projected on the table by beams of monochromatic light different for each photograph.

By making, for each zone of the subject being studied, the plane of the table coincide with the intersection of the two beams corresponding to this zone, and by disposing on the table a surface sensitive solely to the light of one of the beams, a document is obtained formed by the photographic recording of an image resulting from the projection of the corresponding photograph.

If this operation is carried out a second time, after having disposed on the table a new sensitive surface and after having interchanged the types of light of the beams so that the second photographic document is the image resulting from the projection of the other photograph, then two documents are available which can be used for obtaining the stereoscopic plot.

These two documents, or orthophotoplans, can be examined with the aid of an ordinary stereoscope, and it will then be noticed that the superstructures of the subject (such as houses or trees in the frequent case in which this subject is constituted by a territorial region) appear in relief. However, the ground appears rigorously flat and this particularity is detrimental to the observation and the interpretation of the image given by the orthophotoplans.

An object of this invention is to provide a practical stereoscopic plotting apparatus which at least mitigates the above mentioned disadvantage by giving an image in which the relief of the ground, even if it is not very accentuated, is apparent.

A stereoscopic plotting apparatus according to this invention is principally characterized in that it comprises means adapted, during the photographic recording of the image resulting from the projection of one of the photographs, to communicate to the projector effecting this projection, for any variation of the distance from the table to the projectors, a displacement, dependent on this variation, along a direction parallel to the direction passing through the above-mentioned distinct points from which the photographs were taken, a decrease of the distance from the table to the projectors corresponding to a decrease of the separation between the two projectors.

The invention will, in any case, be understood more fully with the aid of the following complementary description, as well as of the accompanying drawing, which complementary description and drawing relate to one embodiment of the invention given purely by way of illustrative example.

The single FIGURE of the drawing shows schematically a stereoscopic plotting apparatus, in accordance with the invention, for obtaining orthophotoplans from, for example, aerial photographs.

With regard first of all to the apparatus as a whole, it comprises, as is known in this art:

a frame 1, a first table 2, fixed on the frame 1, a photographic table 3, displaceable vertically, and carrying a sensitive surface (not shown), a system 4 for scanning the photographic table 3, this scanning system 4 comprising a slot 5 scanning successively adjacent zones of the sensitive surface, two projectors $P_1$ and $P_2$ which are carried by the frame 1.

The two projectors $P_1$ and $P_2$ are respectively provided with objectives 6, 7 and they carry photographs 8, 9 forming a stereoscopic pair relating to a geographical territory to be studied. These projectors $P_1$ and $P_2$ are also provided with lamps 10, 11 projecting beams $F_1$ and $F_2$ of monochromatic light through corresponding zones of the photographs 8, 9 and through the objectives 6, 7. These lamps 10, 11, which are articulated to the projectors $P_1$ and $P_2$, occupy positions controlled by the displacement of the slot 5 (for example by rods connecting the scanning system 4 to the lamps 10, 11), so that the beams $F_1$ and $F_2$ converge towards the slot 5.

The photographs 8, 9 and the beans $F_1$, $F_2$ projecting on the table 3 the images of each zone of the territory occupy positions substantially homologous to the positions that were occupied, during the taking of the photographs, by the photographic films and the beams corresponding to the zone considered.

The lamps 10, 11 light, on the photographs 8, 9, the same zone of territory, and, for each zone projected, the table 3 — which is observed for example in anaglyph — is displaced vertically, so that the intersection of the corresponding beams takes place on the sensitive surface. Thus, in the drawing, two positions on the table 3 have been shown, corresponding to two altitudes which differ by dZ in the plastic (or three-dimensional) image of the territory photographed.

With such an apparatus, one can make, in two operations and by using surfaces sensitive to only one type of monochromatic light forming successively the beams $F_1$ then the beams $F_2$, the photographic recording of the image resulting from the projection of the photograph 8, then of the image resulting from the projection of the photograph 9. The subsequent observation under a stereoscope of these two orthophotoplans gives the impression of a terrain of aspect rigorously flat, which is what the present invention proposes to avoid.

On the apparatus, the following lengths can be considered:

B: the stereoscopic base or spacing of the two photographs 8, 9;

A: the height of the projectors $P_1$ and $P_2$ with respect to the reference plane constituted by the fixed table 2;

Z and Z + dZ: the altitudes of two zones in the plastic image;

d: the distance from the table 3 to the projectors $P_1$ and $P_2$, with d = A − Z.

These lengths are proportional to the corresponding real lengths (distance between the two points from which the photographs were taken, flying altitude with respect to a reference plane; altitudes of two zones of the territory to be studied; flying altitude with respect to a zone of the territory).

The present invention takes advantage of the fact that one can artificially create an impression of relief of the ground by displacing, during the photographic recording of the projection of one of the photographs 8 of 9, the corresponding projector by a distance dB along a direction parallel to the direction passing through the distinct points from which the photographs were taken, as a function of the altitude Z and of its variation dZ, the law being dB = dZ×B/A−Z.

The apparatus in accordance with this invention comprises means adapted, during the photographic recording of the image resulting from the projection of one of the photographs 8 or 9, to communicate to the projector $P_1$ or $P_2$ effecting this projection, for any variation dZ of the distance d from the table 3 to the projectors $P_1$ and $P_2$, a displacement dB, dependent on this variation dZ, along a direction parallel to the direction passing through the distinct points from which the photographs were taken, a decrease of the distance d corresponding to a decrease of the separation B.

According to a preferred embodiment of the invention, these means are such that the law which interconnects dB and dZ is linear, which is sufficient to give a physiological effect of relief, this law being dB = dZ×B/A′ where A′ is the approximate mean value of the distance d = A − Z for the overall image of the territory.

In the following, means will be described which are adapted to communicate displacements to the projector $P_1$, so that the orthophotoplan resulting from the projection of the photograph 8 is modified in accordance with this invention, whereas the orthophotoplan resulting from the projection of the photograph 9 remains unchanged. Needless to say, a reverse arrangement could equally well have been adopted by providing means adapted to displace the projector $P_2$.

The table 3 is displaceable vertically by any appropriate means, controlled manually or electrically. The manual control can be constituted by a handle 12 whose rotation puts in action a jack 14 adapted to displace the table 3 vertically.

The handle 12 is also rigidly connected in rotation with the rotor (not visible in the drawing) of a synchrotransmitter 13 which is associated with a synchroreceiver 15 whose rotor (not visible in the drawing) is rigidly connected in rotation, on the one hand, by means of a gear-box 16 of adjustable transmission ratio, with a threaded shaft 17 carrying a nut 18, and on the other hand, with a handle 19. The projectors $P_1$ and $P_2$ are mounted on the frame 1 by the intermediary of a support (not shown); the projector $P_2$ occupies a fixed position and the projector $P_1$ is solidly connected to the nut 18 and is adapted to slide on its support in order to effect displacements along a direction parallel to the plane of the table 3 and to the plane of the drawing when the shaft 17 rotates.

The direction of displacement of the projector $P_1$ is homologous to the direction passing through the two distinct points from which the photographs were taken; in the case of aerial photographs this direction is the line of flight of the aircraft flying over the territory being photographed.

Finally, there is provided between the synchrotransmitter 13 and the synchroreceiver 15, which are for example of the selsyn type, a switch 20 which is adapted to make or break the electrical connection 21 between the two devices 13 and 15 so that the rotations of the handles 12 and 19 are dependent or independent.

This being the case, the stereoscopic plotting apparatus is used as follows.

First of all the normal orthophotoplan of the image resulting from the projection of the photograph 9 is made. To do this, the connection 21 between the synchrotransmitter 13 and the synchroreceiver 15 is broken by means of the switch 20, thus rendering the rotations of the handles 12 and 19 independent. By means of the handle 19, the position of the projector $P_1$ is adjusted such that the photographs 8 and 9 and the beams $F_1$ and $F_2$ occupy, for each projected zone of the territory, positions substantially homologous to the positions that were occupied, when the photographs were taken, by the corresponding photographic films and beams.

In particular, with the aid of anaglyphic observation, the height of the table 3 is adjusted by the handle 12 for each zone projected so that the rays $F_1$ and $F_2$ projecting the zone in question on the table intersect at the movable slot 5.

On the table 3 is disposed a surface sensitive solely to the monochromatic light of the beams $F_2$, and, by an appropriate exposure of adjacent bands of the sensitive surface with the aid of the movable slot 5, the orthophotoplan of the photograph 9 is made.

Then the modified orthophotoplan of the image resulting from the projection of the photograph 8 is made. To do this, the connection 21 between the synchrotransmitter 13 and the synchroreceiver 15 is made by means of the switch 20, and the rotation of the handle 12 then causes a rotation of the handle 19.

On the table 3 is disposed a surface sensitive solely to the monochromatic light of the beams $F_1$, and the procedure is repeated as during the making of the first orthophotoplan by adjusting by means of the handle 12 the height of the table 3 for each zone projected so that the rays $F_1$ and $F_2$ projecting the zone in question on the table intersect at the slot 5.

When, for a given zone, the handle 12 is turned, the synchrotransmitter 13 and the synchroreceiver 15 transmit a rotation to the shaft 17 which communicates a displacement to the projector $P_1$ and consequently a displacement parallel to itself of the ray $F_1$ which projects the zone in question, the ray $F_2$ remaining fixed.

The intersection of the rays $F_1$ and $F_2$ is displaced along the ray $F_2$, and at the same time, the slot 5 is displaced so that the rays $F_1$ and $F_2$ intersect at the location of this slot 5. The result, on the orthophotoplan, is a displacement of the image of the zone in question. During the stereoscopic observation of the two orthophotoplans thus made, the displacements of the images of the zones of the second orthophotoplan make these zones appear in relief.

In the drawing, there is shown, for an elevation dZ of the table 3, the distance dB by which the projector $P_1$ moves towards the projector $P_2$, the final position of the projector $P_1$ being shown in chain dotted lines.

The ratio of the gear-box 16 is such that dB and dZ are interconnected by the above-mentioned linear relationship. By way of example, the coefficient of proportionality of B/A' can vary from 0.3 for normal objectives 6 and 7 to 0.6 for objectives 6 and 7 of the wide angle type.

Stereoscopic plotting apparatus in accordance with this invention renders visible the relief of the ground, even if it is not pronounced, during the subsequent stereoscopic examination of the two orthophotoplans made with such an apparatus.

Various modifications and changes can be made to the particular embodiment described, without departing from the spirit or scope of this invention.

What I claim is:

1. Stereoscopic plotting apparatus comprising film support means and two projector means including photograph supports mounted for relative movement of approach towards and separation away from one another and variation of distance to and from said film support means, the projectors being adapted to project images of corresponding zones of first and second said photographs, of the same subject photographed from two distinct points to form a stereoscopic pair onto first and second sensitive films respectively when supported by the film support means, said projector means being adapted to locate the respective beams projecting the images of each zone of the subject in positions substantially homologous to the positions of the incident rays by which the photographs were originally taken; an exposure system for the photographic recording of the image resulting from the projection of one and then the other of the respective photographs, on to the two films when supported successively by the film support means, and displacement means arranged to move at least one of the photograph supports, said displacement means comprising first means sensitive to said variation of distance, second means for effecting said relative movement in a plane parallel to the plane of the film support means and in a direction homologous to that passing through said two distinct points, and coupling means coupling said second means to said first means so that the amount of said relative movement can be made dependent on said variation of distance from the film support means to the photograph supports, a decrease or increase in said distance corresponding to said approach or separation respectively of the photographs.

2. Apparatus according to claim 1, wherein said displacement means are arranged to displace only one photograph support.

3. Apparatus according to claim 2, including a jack for adjusting the distance from the film support means to the photographs, a first control member to actuate the jack, and wherein said displacement means comprise:

a synchrotransmitter whose rotor is rigidly connected in rotation to said first control member;

a synchroreceiver which is associated with said synchrotransmitter and whose rotor is rigidly connected in rotation, on the one hand, to a second control member, and on the other hand, to a threaded shaft, a nut rigidly connected to one of the projectors and in threaded engagement on the shaft, the assembly being so arranged that the rotation of the threaded shaft communicates to the nut and to the projector connected thereto a displacement parallel to said threaded shaft and dependent on the rotation of said threaded shaft;

and switch means adapted to make or break the electrical connection between the synchrotransmitter and the synchroreceiver so that the rotations of said first and second control members are dependent when said electrical contact is made or independent when said electrical contact is broken.

4. Apparatus according to claim 3, including a gear-box in rotary driving connection between the rotor of the synchroreceiver and the threaded shaft, said gear-box having an adjustable transmission ratio.

* * * * *